United States Patent [19]
Yoon

[11] Patent Number: 6,071,174
[45] Date of Patent: Jun. 6, 2000

[54] PORTABLE CHILD'S AMUSEMENT AND EDUCATIONAL CENTER

[76] Inventor: Young W. Yoon, 127 Michael Mannor, Glenview, Ill. 60025

[21] Appl. No.: 09/141,946

[22] Filed: Aug. 28, 1998

[51] Int. Cl.⁷ .................................................. A63H 17/00
[52] U.S. Cl. ........................................ 446/478; 446/476
[58] Field of Search .................................. 446/476, 478, 446/487, 7; 434/72, 73, 416

[56] References Cited

U.S. PATENT DOCUMENTS

| | | |
|---|---|---|
| D. 366,511 | 1/1996 | Coddington, Jr. . |
| D. 367,310 | 2/1996 | Ziegler, Jr. et al. . |
| D. 379,209 | 5/1997 | Coddington, Jr. . |
| D. 393,686 | 4/1998 | Coddington, Jr. et al. . |
| 4,556,391 | 12/1985 | Tardivel et al. ............................. 446/7 |
| 5,069,623 | 12/1991 | Peat .......................................... 446/476 |
| 5,525,088 | 6/1996 | Mayne ...................................... 446/476 |
| 5,733,165 | 3/1998 | Kelley ...................................... 446/478 |

FOREIGN PATENT DOCUMENTS 2307173  11/1996  United Kingdom .

OTHER PUBLICATIONS

Hammacher Schlemmer Catalog; 22–Foot Configurable Play Maze; Summer, 1998 Catalog; p. 65.

Hammacher Schlemmer Catalog; Pop–Up Play Hut; Summer, 1998 Catalog; p. 64.

*Primary Examiner*—Sam Rimell
*Attorney, Agent, or Firm*—Price, Heneveld, Cooper, DeWitt & Litton

[57] ABSTRACT

A portable child's amusement and educational center comprises a tent suitable for children's play of the type generally having flexible walls supported by a frame and a portal for entering and exiting, and a learning board for educational learning attached to the tent. The learning board is removable and interchangeable, and may contain educational exercises, allow for writing on its surface, or for attachment of alphanumeric characters or figures. The learning board is removably contained in a pocket assembly, which may further preferably comprise sub-pockets for containing various child's play articles.

7 Claims, 2 Drawing Sheets

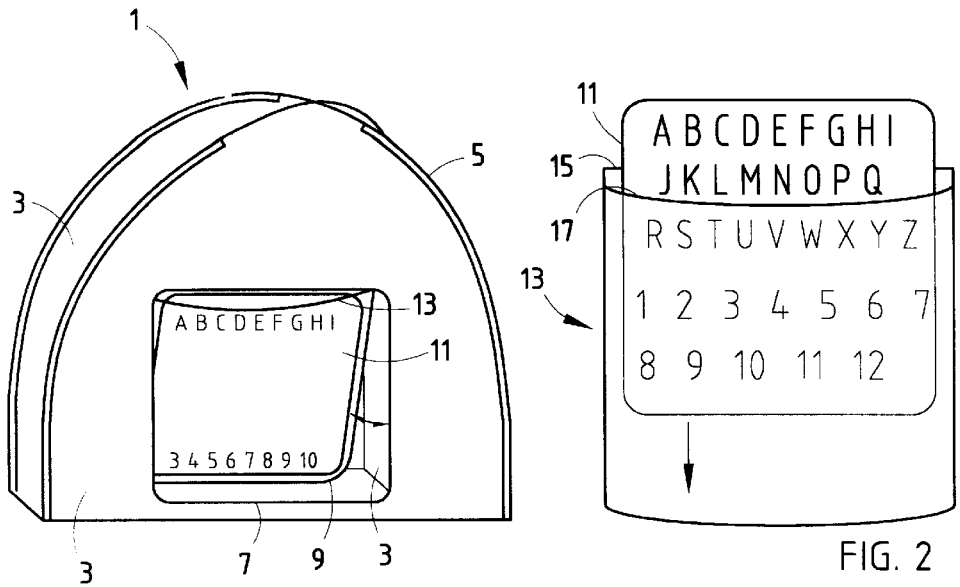
FIG. 2
FIG. 4
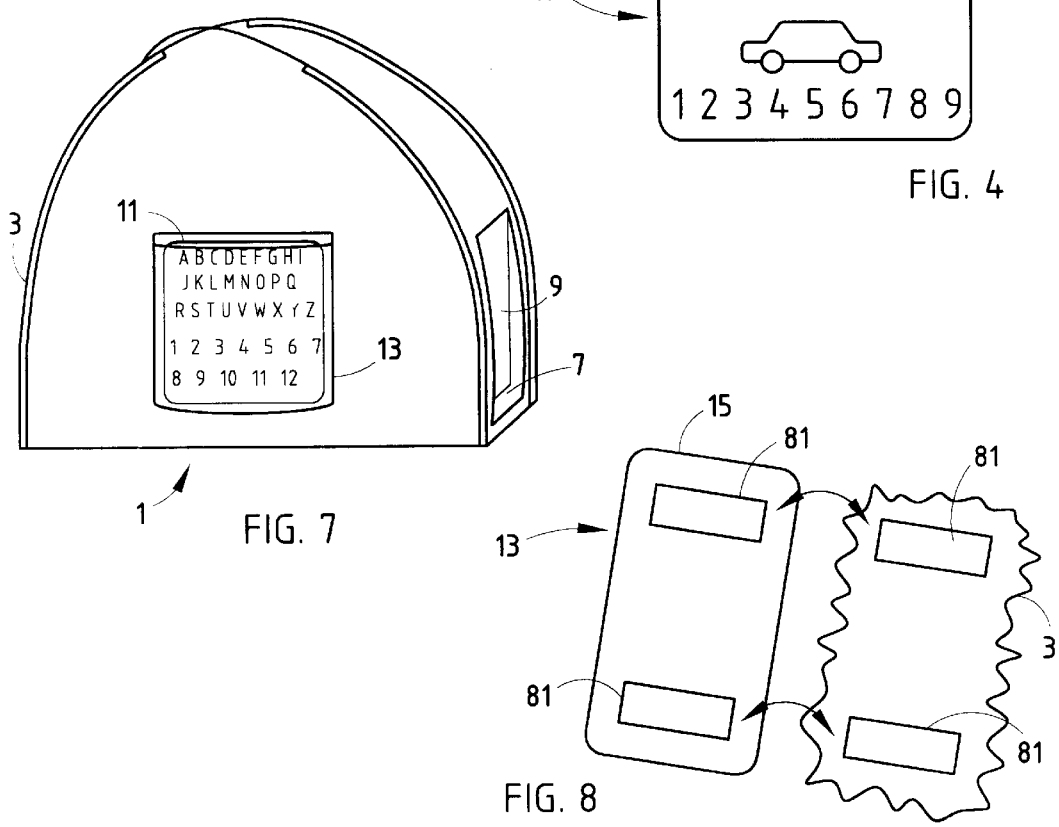
FIG. 7
FIG. 8

PORTABLE CHILD'S AMUSEMENT AND EDUCATIONAL CENTER

FIELD OF THE INVENTION

The present invention relates to an improved child's amusement and educational center. More particularly, the present invention comprises an improved children's play tent further comprising a learning board attached to the tent for amusement as well as educational instruction in reading, writing, arithmetic, and the like.

BACKGROUND OF THE INVENTION

Tents, portable structures, and the like have been known for centuries. In the recent past, these structures, particularly tents, have been used as children's play things. Often, these tents are small, self supporting, and used indoors for children of ages below 12 as a play area. They may be sized to fit several children, and to house other playthings, such as balls, building blocks, and the like. They assume various colors, patterns, and configurations, such as, for example, a fort.

Although tents in general and children's play tents in particular are known in the art, there are currently no children's play tents that further offer an educational or teaching environment. More particularly, none of the children's tents of the prior art provide interactive stimulation for development of reading, writing, arithmetic, or geography skills.

Therefore, there is an unresolved need for a children's play tent that comprises means for educational or learning opportunities.

OBJECTS OF THE INVENTION

It is an therefore an object of the present invention to provide a children's play tent that offers educational learning as well as amusement.

It is a further object of the invention to provide a children's play tent that is easily erected and safe to use.

It is a further object of the invention to provide a children's play tent that comprises interchangeable learning boards.

It is a further object of the invention to provide a children's play tent that comprises learning boards in an array corresponding to pocket arrays that allow for interactive educational activities with children.

SUMMARY OF THE INVENTION

The present invention is a portable children's amusement and learning center generally comprising a tent suitable for children's play providing opportunities for educational instruction or teaching.

It is desirable to provide children with interactive learning stimuli in a play setting in order to encourage children's learning by making it enjoyable. Accordingly, the present invention generally comprises a tent of the type suitable for children's play, with a learning board affixed to the tent for educational instruction and exercises.

The tent of the present invention generally comprises the type having flexible walls of sheetlike material joined together to form an enclosure. The walls may be transparent, and are preferably comprised of mesh. Mesh walls insure that children may be watched while playing, allow for a fresh flow of air, and minimize dangers of asphyxiation. The preferred tent further comprises a portal covered by a door of flexible material in at least one of its walls for entering and exiting the tent interior.

The learning board of the present invention generally comprises a substantially flat board surface for writing or for affixing educational figures such as alphanumeric characters. One embodiment of the board may comprise an erasable surface for writing. Another embodiment may comprise a surface and means for removably attaching alphanumeric or other characters or figures thereto. Still another board may comprise figures, questions, and fill in answer blanks for a learning exercise, such as identification of states from a map of the United States.

The preferred embodiment of the invention comprises a series of such interchangeable learning boards, each with a different learning message or exercise. The learning board may be removably attached directly to the tent, or may be contained within a pocket assembly with means for attachment to the tent. The pocket assembly may generally be attached to the tent on any of its interior or exterior walls, on its door interior or exterior, or, preferably, the pocket assembly may comprise the door itself A preferred pocket assembly is comprised of a flexible back panel and a flexible front panel joined together about their bottom and side edges to form a pocket accessible through its top. The learning board is removably contained within the preferred pocket assembly. At least the front panel is comprised of a legibly transparent material so that the learning board surface is legible through the pocket assembly front panel. The material comprising the front panel, like the walls, may preferably be plastic mesh or clear plastic material. Attachment means may comprise hooks and loops, snaps, ties, or adhesives.

As noted, the preferred embodiment of the pocket assembly comprises a pocket formed as the door flap of the tent. The preferred door flap comprises a closeable panel covering the tent entrance portal, with the flap hinged at the top. The preferred pocket assembly comprises a front panel generally the same size as and corresponding to the door flap covering the tent portal, and is connected to the flap about its side and bottom edges, thereby forming a pocket accessible through its top edge. The learning board is removably contained within the pocket. The pocket top panel is transparent such that the learning board contained therein is legible.

The pocket assembly may also comprise a plurality of sub-pockets arranged in an array for removably holding children's play articles. The tent of the invention may further comprise such play articles, including balls. The array of the sub pockets may be arranged to superimpose and register with certain indices of the learning boards. For instance, a sub-pocket may be labeled "red ball", via the visible learning board behind it, to indicate a holding place for a red ball. Such labeling encourages reading and analytical thought by children.

The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the several embodiments of the disclosure in detail, it is to be understood that the disclosure in not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

The objects of the invention have been well satisfied. These advantages and others will become more fully apparent from the following detailed description when read in conjunction with the accompanying drawings.

BRIEF DESCRIPTION OF THE DRAWINGS

FIG. 1 is a perspective of a first embodiment of the improved tent of the invention;

FIG. 2 is a view from the front of the pocket assembly of the first embodiment of the invention containing a message board;

FIG. 4 is a view of the preferred pocket assembly of the invention containing yet another message board;

FIG. 7 is a perspective view of a second embodiment of the invention;

FIG. 8 is a view of the back of the pocket assembly of a second embodiment of the invention wherein the pocket is attached to a tent sidewall.

DETAILED DESCRIPTION OF THE INVENTION

Figure 5:
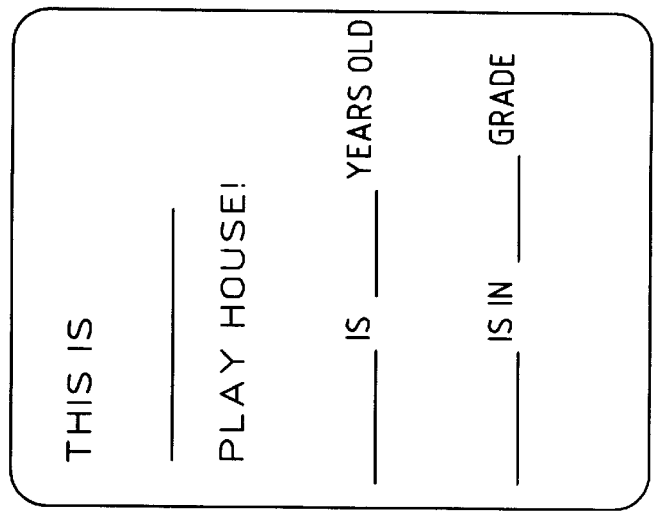
FIGS. 5 and 6 are views of additional message boards of the invention.

The best mode for carrying out the invention is presented in terms of the preferred embodiment, wherein similar reference characters designate corresponding features throughout the several figures of the drawings.

Turning now to the Figures, FIG. 1 shows a perspective view of a first and preferred embodiment of the invention. A portable children's amusement and educational center 1 generally comprises a tent having a plurality of sidewalls 3, a frame 5, and a portal 7 through at least one of the walls 3 for entering and exiting the tent. It is noted that although FIG. 1 shows a structure with four sidewalls, the present invention may comprise a structure having more or fewer sidewalls, assuming, for example, a triangular or octagonal configuration.

Portal 7 has a closeable door flap 9 for covering it. Door flap 9 preferably has means for releasably securing its edges to the portal 7 perimeter, such as hook and loop mating sets 10, although other attachment means, such as ties, snaps, zippers or the like may be used. Frame 5 is preferably connected to sidewalls 3 by stitched sleeves 12, and is comprised of a pair of interconnected fiberglass poles attached at each corner of the tent at loops 14 as known in the art, to allow for easy tent erection, disassembly, transport, and storage. Preferably, the poles are joined by a connector 16 at the apex of the tent to shorten the frame 5 when stored.

Sidewalls 3 are generally comprised of a lightweight, flexible sheetlike material, and preferably of a mesh material. Mesh composition allows for relative transparency so that children may be visibly observed during play. Mesh also allows for air flow, so that temperature in the tent remains desirably ambient and reducing any possibility of accidental asphyxiation.

The portable children's amusement and learning center further comprises a substantially flat learning board 11, and preferably comprises a plurality of interchangeable learning boards 11. Each learning board 11 may be directly attached to any of the tent walls or door, but is preferably removably held in a pocket assembly 13 attached to the tent. As shown in FIG. 1, the learning board 11 is removably contained in such a preferred pocket assembly 13. The learning boards 11 are preferably interchangeable to provide for different lessons, exercises, and entertainment as required for different children. This allows for the portable learning and amusement center of the present invention to change and grow with children and thereby to remain useful as a child advances in age, education, and interests.

Figure 3:
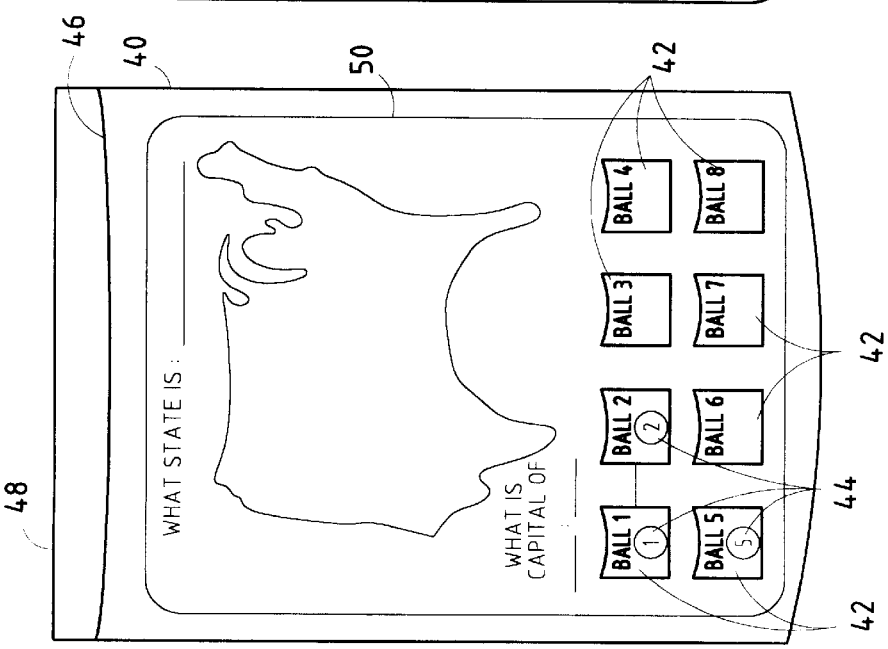
FIG. 3 is another view of the pocket assembly of the invention containing another message board.

FIGS. 2 shows learning board 11 being placed in pocket assembly 13, while FIG. 3 shows another learning board 11 in position. Pocket assembly 13 preferably comprises a back panel 15 and a front panel 17. Front panel 17 and back panel 15 are joined about their side and bottom edges to thereby form a pocket accessible through the open top edge for removably containing message board 11. Front panel 17 is preferably transparent, such that learning board 11 is legible through it. Panel 17 may be comprised of mesh cotton or plastic, or may be comprised of legibly clear plastic sheeting.

FIG. 4 shows a pocket assembly 13 further including a preferred sub-pocket assembly 40 comprising a plurality of sub-pockets 42 for removably containing children's play articles, such as balls 44 or the like. Pocket assembly 40 preferably includes a plurality of transparent front panels 46 joined about their side and bottom edges to front panel 17. As depicted in FIG. 4, learning board 11 has writing 23 corresponding to the array of sub-pockets 42. In this manner, when placed in pocket 1340, the writing on the lower portion of learning board 50 will be visible immediately below the sub-pockets 42 or very close thereto.

Preferred sub-pockets 42 serve several important functions. As the preferred embodiment of the portable children's amusement and learning center of the invention, the sub-pockets 42 are adapted to accept additional play articles, such as balls 44 or the like. Since sub-pockets 42 may be used to hold such various play articles, they are useful for organizing the play tent and reducing clutter therein, as shown in FIG. 7. As depicted in FIG. 4, learning board 11 preferably includes writing or indicia 23 in registry with the subpockets 42 within which respective play articles are respectively held. Such instructive indicia 23 in combination with corresponding sub-pockets 42 provides further learning opportunities for children, and encourages analytical thinking.

Figure 6:
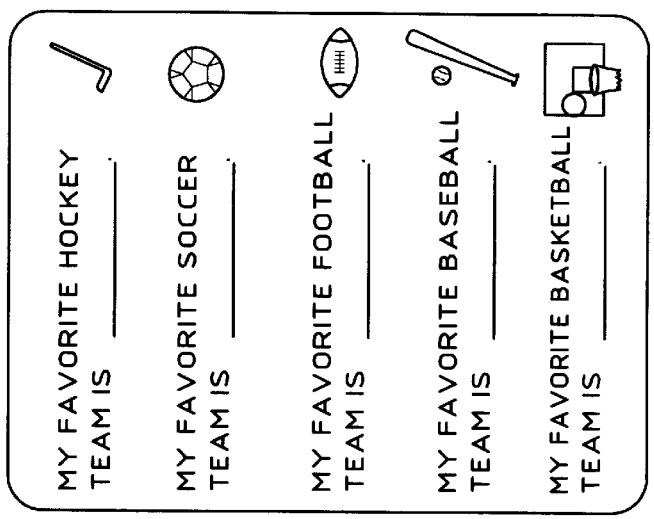

FIGS. 5 and 6 show preferred learning board 11 with front surface 21. Surface 21 is preferably suitable for erasable writing, or for removably affixing alphanumeric characters 23 and various figures. The preferred embodiment of the portable children's amusement and learning center of the invention comprises a plurality of different learning boards 11, such as shown in FIGS. 5 and 6 which may be interchangeably used. For example, the preferred plurality of learning boards 11 may encourage children to respond to geography questions or to otherwise provide creative input, such as identification of favorite sports teams. Such interactive tools desirably stimulate the development of critical and analytical thought in children.

A relatively limitless variety of interchangeable learning boards 11 are available or may be created. Having such a variety of learning boards is desirable to offer fresh and different educational lessons and instructive exercises to children who may have relatively short attention spans.

Further, because the learning boards 11 are freely interchangeable and infinitely customizable, they may be tailored to particular needs of particular children or applications. For example, various learning boards 11 can be developed for school, home, day care, or hospital applications. Also, different boards 11 may be used for children of different ages and educational advancement, so that the portable play and learning center of the present invention will not become obsolete as a child grows.

FIG. 7 shows a second embodiment of the portable amusement and learning center of the invention, with learning board 11 and pocket assembly 13 attached to a tent sidewall 3. The learning board 11 of FIG. 7 utilizes the attachment means 50 as shown in FIG. 8 for attaching board 11 to sidewall 3. FIG. 8 shows the back of the pocket assembly 13 and back panel 15, wherein the pocket 13 is attached to tent sidewall 3 rather than the door 9. Attachment means 50 comprising mating hook and loop pairs 52, 54 attached to the tent side wall 3 and pocket assembly back panel 15, respectively. Other preferred attachment means may comprise snaps, ties, or the like.

The advantages of the disclosed portable children's learning and amusement center are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:

1. A portable child's amusement and educational center comprising:
   a) a substantially flat learning board having educational indicia upon an exposed surface thereof by which a child may be amused and educated;
   b) a portable enclosure of a flexible sheet like material having a plurality of abutting and adjacent walls, a support for supporting said walls, a floor attached about its periphery to a lower edge of each of said walls, and a portal through one of said walls for egress and ingress to and from said enclosure; and
   c) a pocket assembly for receiving therein said learning board, said pocket being sealed on each side edge and bottom edge, and having an open upper edge through which said learning board is inserted, and
   d) a plurality of interchangeable learning boards each having different amusement or educational instruction or exercises.

2. A portable child's amusement and educational center comprising:
   a) a plurality of interchangeable substantially flat learning boards, each having different educational educational indicia corresponding to instruction or exercises on an exposed surface by which a child may be amused and educated;
   b) a portable enclosure of a flexible sheet like material having a plurality of abutting and adjacent walls, a frame member extending along a side edge of each of said walls for supporting said walls, a floor attached about its periphery to a lower edge of each of said walls, and a portal through one of said walls for egress and ingress to and from said enclosure;
   c) a closeable door flap having a top, bottom and two side edges removably covering said portal, said door flap hingedly attached along said top edge to said one of said walls, said door flap having fastening means for removably attaching said side edges and bottom edge to said one of said walls, said fastening means selected from the group consisting of ties, mating hook and loop sets, or snaps,
   d) a pocket assembly for receiving therein one of said plurality of said learning boards, said pocket releasably attached to said tent whereby a child may be amused and educated.

3. A children's amusement and educational center as in claim 2, wherein said pocket assembly further comprises a plurality of sub-pockets attached to said pocket assembly, said sub-pockets superimposed over and registering with said indicia of one of said plurality of said learning boards in said pocket.

4. A children's amusement and educational center as in claim 2, wherein said flexible sheetlike material comprises mesh.

5. A children's amusement and educational center as in claim 2, wherein said pocket assembly further comprises a top panel attached about each side edge and lower edge to said door flap, thereby forming a pocket with open upper edge for inserting said learning board.

6. A portable child's amusement and educational center comprising:
   a) a plurality of interchangeable substantially flat learning boards, each having different educational educational indicia corresponding to instruction or exercises on an exposed surface by which a child may be amused and educated,
   b) a portable enclosure of a flexible sheet like material having a plurality of abutting and adjacent walls, a frame member extending along a side edge of each of said walls for supporting said walls, a floor attached about its periphery to a lower edge of each of said walls, and a portal through one of said walls for egress and ingress to and from said enclosure;
   c) a closeable door flap having a top, bottom and two side edges removably covering said portal, said door flap hingedly attached along said top edge to said one of said walls, said door flap having fastening means for removably attaching said side edges and bottom edge to said one of said walls, said fastening means selected from the group consisting of ties, mating hook and loop sets, or snaps,
      i) said door flap comprising a pocket assembly for receiving therein one of said plurality of said learning boards, said pocket assembly attached to said door flap, said pocket being sealed on each side edge and bottom edge, and having an open upper edge through which said one of said plurality of said learning board is inserted,
      ii) a plurality of sub-pockets attached to said pocket assembly, said sub-pockets superimposed over and registering with said indicia of said one of said plurality of said learning board in said pocket by which a child may be amused and educated.

7. A children's amusement and educational center as in claim 6, wherein said flexible sheetlike material comprises mesh.

* * * * *

UNITED STATES PATENT AND TRADEMARK OFFICE
CERTIFICATE OF CORRECTION

PATENT NO.   : 6,071,174
DATED        : June 6, 2000
INVENTOR(S)  : Young W. Yoon Page 1 of 1

It is certified that error appears in the above-identified patent and that said Letters Patent is hereby corrected as shown below:

Column 1,
Line 36; delete "an" (first occurrence).

Column 2,
Line 65; "in not" should be -- is not --.

Column 4,
Line 32; "1340," should be -- 13, 40 --.

Column 5,
Line 56; delete "educational" (second occurrence).

Column 6,
Line 31; delete "educational" (second occurrence).
Line 57, "board" should be -- boards --.
Line 61, "board" should be -- boards --.

Signed and Sealed this

Eighteenth Day of September, 2001

*Attest:*

*Attesting Officer*

NICHOLAS P. GODICI
*Acting Director of the United States Patent and Trademark Office*